US005525395A

United States Patent [19]
Huang

[11] Patent Number: 5,525,395
[45] Date of Patent: Jun. 11, 1996

[54] COMBINATION OF DUAL CELL HONEYCOMB STRUCTURES

[75] Inventor: Chung-chen Huang, Taipei, Taiwan

[73] Assignee: Teh Yor Industrial Co., Ltd., Taiwan

[21] Appl. No.: 367,030

[22] Filed: Dec. 28, 1994

[51] Int. Cl.$^{6}$ .......... B32B 3/12
[52] U.S. Cl. .......... 428/116; 428/188
[58] Field of Search .......... 428/116, 188; 156/197; 160/84.01, 84.05

[56] References Cited

U.S. PATENT DOCUMENTS

| | | | |
|---|---|---|---|
| 4,288,485 | 9/1981 | Suominen | 428/116 |
| 4,307,768 | 12/1981 | Anderson | 428/116 X |
| 4,450,027 | 5/1984 | Colson | 156/197 X |
| 4,603,072 | 7/1986 | Colson | 428/188 X |
| 4,631,108 | 12/1986 | Colson | 156/461 |
| 4,631,217 | 12/1986 | Anderson | 428/118 |
| 4,676,855 | 6/1987 | Anderson | 156/193 |
| 4,677,012 | 6/1987 | Anderson | 428/116 |
| 5,152,647 | 10/1992 | Sewell | 428/116 X |
| 5,160,563 | 11/1992 | Kutchmarek et al. | 156/204 |
| 5,193,601 | 3/1993 | Corey et al. | 428/116 X |

FOREIGN PATENT DOCUMENTS

| | | | |
|---|---|---|---|
| 756270 | 9/1956 | United Kingdom | 428/188 |

*Primary Examiner*—Henry F. Epstein
*Attorney, Agent, or Firm*—Olson & Hierl, Ltd.

[57] ABSTRACT

A combination of dual cell honeycomb structures comprising a plurality of honeycomb dual cell units in horizontal 8-figured configuration formed of a continuous length of foldable material, then stacked and adhered to each other vertically so as to form three columns of the cells side by side.

11 Claims, 2 Drawing Sheets

COMBINATION OF DUAL CELL HONEYCOMB STRUCTURES

FIELD OF THE INVENTION

This invention relates to a novel combination of dual cell honeycomb structures useful in a window covering and the like. More particularly, this invention relates to a combination consisting of a plurality of horizontal dual cell honeycomb structures formed of a continuous length of foldable material folded into an 8-figured configuration, stacked and adhered to each other vertically to form three columns of the cells.

BACKGROUND OF THE INVENTION

Various honeycomb structures made of foldable material are disclosed in the prior art. For example, U.S. Pat. Nos. 4,450,027, 4,603,072 and 4,631,108 to Colson disclose a honeycomb structure constructed by folding a continuous length of foldable material at diametrically opposite sides partially over itself into a tubular form as an individual cell. In addition, U.S. Pat. No. 4,677,012 to Anderson discloses a honeycomb structure formed of a continuous length of foldable material having its longitudinal edges folded over one side of the material and secured to a separate strip material. In this patent the cells are also formed one by one and an additional strip material is required. Another U.S. Pat. No. 4,631,217 to Anderson discloses a honeycomb structure formed of a continuous length of foldable material which is folded into a Z-configuration. In this patent each cell is constituted at a front face by a piece of material and at a rear face by another piece of material, in which each piece of material is extended from one cell to an adjacent cell. Each, individual cell is formed by each one half of two pieces of material.

In order to overcome the disadvantages of lower productivity and inferior quality control, U.S. patent application Ser. No. 08/346,045 filed on Nov. 29, 1994 and assigned to the same assignee of this application provides a dual cell honeycomb formed of a continuous length of foldable material folded into a vertical 8-figured configuration, a plurality of which may be stacked and adhered to each other superposedly to form a window covering having a single column of cells in the structure. For enhancing the effective optical and thermal insulations and durable dimensional stability, a structure consisting of plural columns of cells is usually required.

U.S. Pat. No. 4,307,768 suggests an energy conserving insulative window shade essentially consisting of a multiplicity of parallel hollow channels formed by a plurality of initially parallel layers and adhered along the edges of the shade. In this shade the adhesion lines are visually exposed and always formed in a slovenly appearance, which is obviously not preferred for use in the window coverings.

SUMMARY OF THE INVENTION

Accordingly, it is an object of this invention to provide a combination of dual cell honeycomb structures useful in a window covering and the like, having the various advantages of higher productivity, better quality control, most effective optical and thermal insulations as well as neat appearance.

The object is accomplished by providing a novel combination comprising a plurality of dual cell honeycomb structures formed of a continuous length of foldable material folded into a horizontal 8-figured configuration, stacked and adhered to each other vertically so as to form three columns of the cells side by side.

The aforementioned and other objects, features and advantages will be better understood from the following detailed description with reference to the embodiments as illustrated in the accompanying drawings. Of course, the embodiments are given for illustration purposes only and by no means to exert any limitation thereof.

DETAILED DESCRIPTION OF THE PREFERRED EMBODIMENTS

Figure 1:
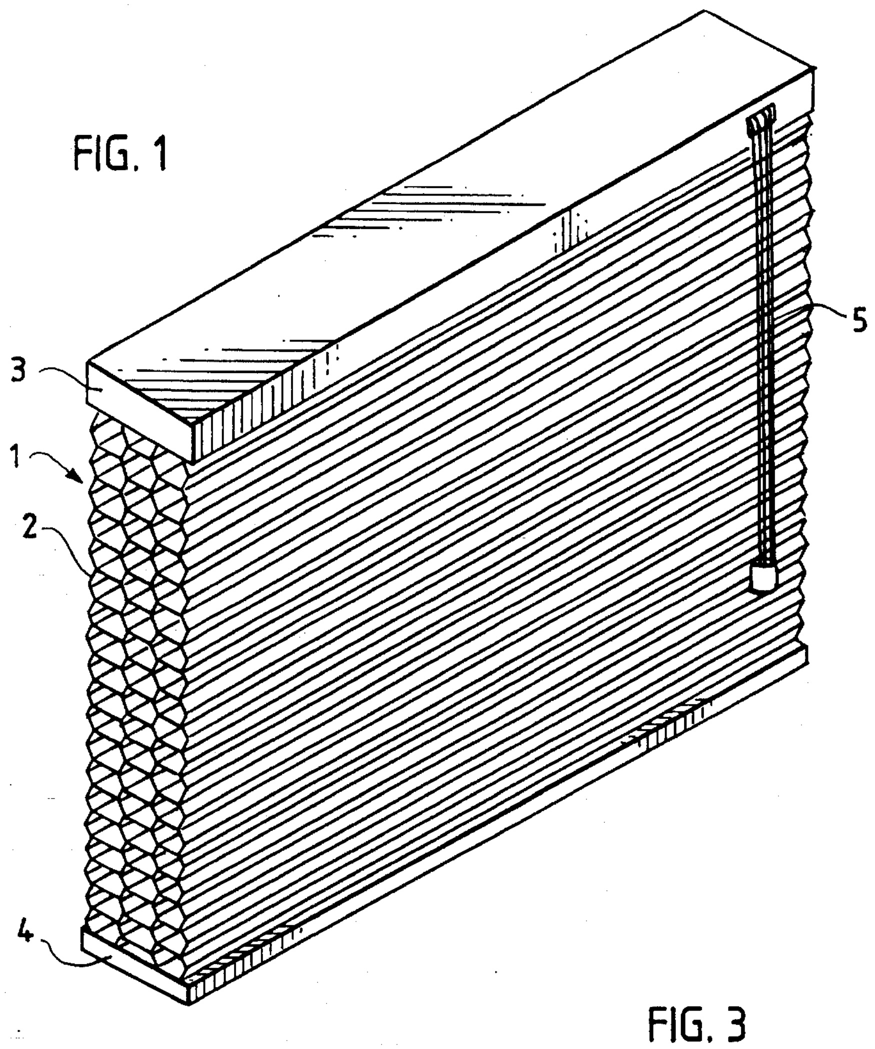
FIG. 1 is a schematic perspective view of the window covering made of the combination according to the present invention.

At first, reference is made to FIG. 1 of the accompanying drawings, in which a window covering generally designated by the symbol number 1 comprises a combination consisting of a plurality of honeycomb structures 2 in three columns of cells side by side in parallel vertically among each other, to be described in detail hereinafter, a top rail 3, a bottom rail 4 and pull cords 5.

Figure 2:
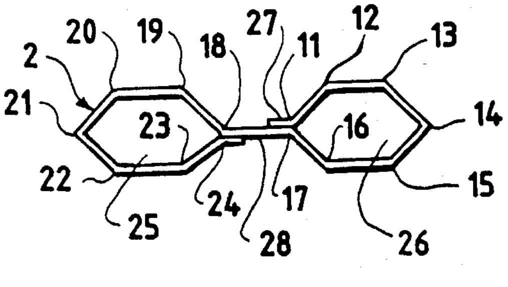
FIG. 2 is an elevational view of one unit of a dual cell honeycomb structure according to the first embodiment of the present invention.

As shown in FIG. 2, in the first embodiment of the present invention a unit of dual cell honeycomb structure 2 is formed of a continuous length of foldable material, such as fibrous material, e.g. papers, textile fabrics and the like. The material is longitudinally folded to have a cross section in a horizontal 8-figured configuration, namely, dual hexagonal cells, and to set permanently a plurality of equidistant creases. Fourteen creases are shown at 11, 12, 13, 14, 15, 16, 17, 18, 19, 20, 21, 22, 23 and 24 resulting in twelve sections having the same length between respective adjacent creases 11 through 24, forming two cells 25 and 26 in symmetrical relationship to each other side by side horizontally. Both terminal edges 27 of the foldable material outside of the first crease 11 and the last crease 24 are deflected inwards in opposite directions and adhered onto a horizontal intermediate or interconnecting section 28 between the two cells 25 and 26.

Figure 3:
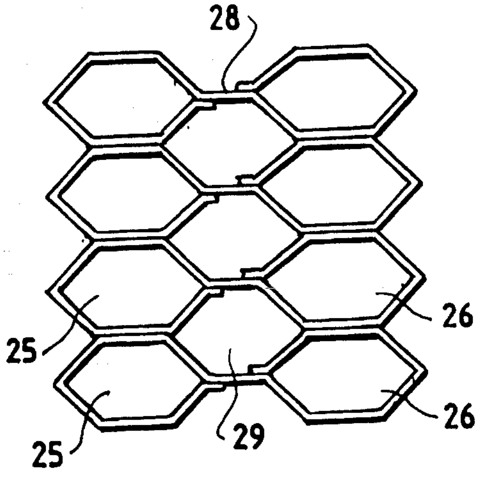
FIG. 3 is an elevational view of a portion of the combination according to the present invention, illustrating four units of the dual cell honeycomb structure according to the first embodiment of the present invention.

A plural number of horizontal dual cell honeycomb structures 2 are stacked vertically such that the left-hand cell 25 of one structure 2 is in alignment on the top of a similar left-hand cell 25 of another structure 2 while the right-hand cell 26 of said one structure 2 is in alignment on the top of a similar right-hand cell 26 of said another structure 2, and adhered to each other superposedly, as best seen in FIG. 3, to form the left- and right-hand columns of cells 25 and 26, respectively. At the same time, a central cell 29 is formed between two adjacent units of dual cell honeycomb structure, defined by a horizontal intermediate section 28 and two adjoining inclinedly deflected sections at a lower side of one unit together with the corresponding horizontal intermediate section 28 and two adjoining inclinedly deflected sections at an upper side of another unit. In this manner, a central column of honeycomb cells 29 is formed between said left- and right- hand columns of cells 25, 26 so that a whole honeycomb combination of three columns of the cells 25, 26 and 29 is accomplished.

Figure 4:
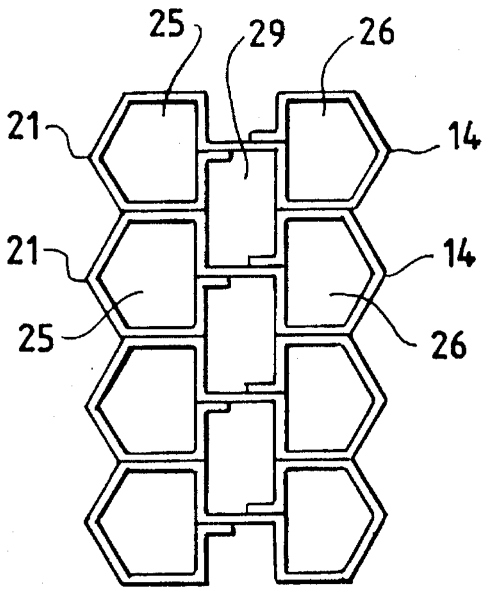
FIGS. 4 to 6 are similar to FIG. 3, but illustrate second, third and fourth embodiments, respectively.

In the second embodiment as shown in FIG. 4, it is substantially the same as that described in conjunction with the aforementioned first embodiment, provided that the two cells 25, 26 each have both inner inclinedly deflected sections slightly smaller in length than both outer inclinedly deflected sections. When the honeycomb combination is expanded to the greatest extent, both inner deflected sections of two cells 25, 26 become a straight line, as illustrated, and both outer sections remain inclinedly deflected so that permanent lines of creases 14 and 21 are assured.

Figure 5:
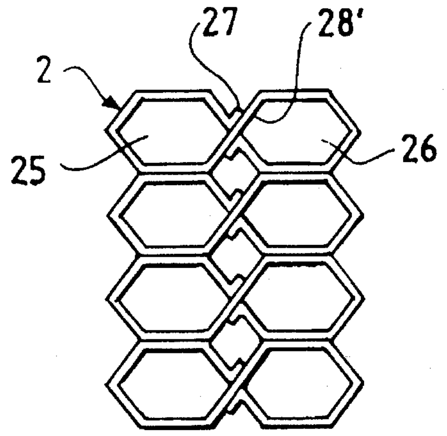

FIG. 5 illustrates the third embodiment, in which the horizontal intermediate section 28 is replaced by an intermediate or interconnecting section 28' linked from one of the inclinedly deflected inner sections of one cell 25 to opposite one of the inclinedly deflected inner sections of another cell 26 in an inclinedly straight line, and both deflected terminal edges 27 of the continuous length of the foldable material are adhered onto said inclined intermediate section 28'.

Figure 6:
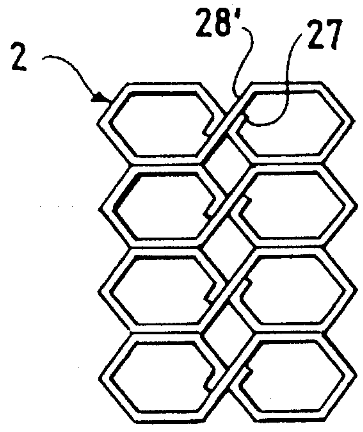

FIG. 6 illustrates the fourth embodiment substantially the same as the aforementioned third embodiment provided that the terminal edges 27 are deflected inwards in comparison with the outward deflection of the terminal edges 27 as shown in FIG. 5. Of course, the terminal edges 27 in the first and second embodiments as shown in FIGS. 2, 3 and 4 may be instead deflected inwards as described too.

As used herein, the term of "honeycomb" is broadly defined to indicate generally connected cells, including the configurations of hexagonal, rectangular and other polygonal types and the modification thereof.

The combination of dual cell honeycomb structure according to the preferable embodiments at present has been described hereinabove as exemplary of the invention. However, it should be noted that other modifications, variations and changes can be made to the invention without departing from the spirit and scope thereof. Accordingly, the invention is not intended to be restricted to the foregoing embodiments, but is only limited by the scope of the appended claims.

What I claim is:

1. A window covering comprising a plurality of honeycomb dual cell units in horizontal 8-figured configuration formed of a continuous length of foldable material, the units having terminal ends each folded onto respective opposing sides of the material, then stacked and adhered to each other vertically so as to form three columns of the cells side by side.

2. The combination of claim 1, wherein each of said dual cell units consists of a left-hand cell, a right-hand cell and an intermediate section interconnecting said right- and left-hand cells together.

3. The combination of claim 2, wherein said left- and right- hand cells are in symmetrical relationship to each other side by side horizontally.

4. The combination of claim 3, wherein each of said left- and right- hand cells is in a hexagonal shape having two inclinedly deflected inner sides, two inclinedly deflected outer sides and two horizontal sides connecting respective inner and outer sides.

5. The combination of claim 4, wherein said six sides of a cell are substantially a same length, and wherein said intermediate section interconnecting said two cells horizontally is a length substantially the same as one of said six sides.

6. The combination of claim 4, wherein said plurality of dual cell units are stacked vertically and adhered to each other in such a manner that said left-hand cell of one unit is in alignment on the top of a similar left-hand cell of another unit while the right-hand cell of said one unit is in alignment on the top of a similar right-hand cell of said another unit, and adhered to each other superposedly, to form the left- and right- hand columns of cells, respectively, and an additional central column of cells is formed between said left- and right- hand columns of cells.

7. The combination of claim 4, wherein said inner sides have a length smaller than that of said outer sides.

8. The combination of claim 4, wherein said intermediate section is constituted by an interconnecting section linked from one of said inclinedly deflected inner sides of one cell to an opposite one of said inclinedly deflected inner sides of another cell in an inclinedly straight line.

9. A window covering comprising a plurality of dual cell honeycomb structures, each dual cell honeycomb structure includes a continuous length of material having terminal ends each folded onto respective opposing sides of the material to form at least two cells in a symmetric relation, wherein the plurality of structures are adhered together to define other cells.

10. The window covering of claim 9 wherein the material has outer sections that are inclinedly deflected.

11. A dual-cell unit for use in a collapsible window covering comprising a continuous length of material having terminal ends that are connected to respective opposing sides of the material to define two cells, each cell including a crease defined by the material between the terminal ends such that when the window covering is collapsed, the crease protrudes from the cell.

* * * * *